United States Patent
Seo et al.

(10) Patent No.: US 9,155,081 B2
(45) Date of Patent: Oct. 6, 2015

(54) METHOD AND DEVICE FOR SCHEDULING IN CARRIER AGGREGATION SYSTEM

(75) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 13/983,281

(22) PCT Filed: Feb. 8, 2012

(86) PCT No.: PCT/KR2012/000907
§ 371 (c)(1),
(2), (4) Date: Aug. 1, 2013

(87) PCT Pub. No.: WO2012/108679
PCT Pub. Date: Aug. 16, 2012

(65) Prior Publication Data
US 2013/0315113 A1    Nov. 28, 2013

Related U.S. Application Data

(60) Provisional application No. 61/440,388, filed on Feb. 8, 2011.

(51) Int. Cl.
*H04W 72/04* (2009.01)
*H04L 5/00* (2006.01)

(52) U.S. Cl.
CPC .......... *H04W 72/0406* (2013.01); *H04L 5/001* (2013.01); *H04L 5/0053* (2013.01); *H04L 5/0098* (2013.01)

(58) Field of Classification Search
CPC ..... H04L 5/001; H04L 5/0098; H04L 5/0053; H04W 72/0406
See application file for complete search history.

(56) References Cited

U.S. PATENT DOCUMENTS

2010/0254268 A1* 10/2010 Kim et al. ............. 370/241
2010/0254329 A1* 10/2010 Pan et al. ............... 370/329
(Continued)

FOREIGN PATENT DOCUMENTS

| KR | 10-2009-0064484 | 6/2009 |
| KR | 10-2010-0017420 | 2/2010 |

(Continued)

OTHER PUBLICATIONS

Korean Intellectual Property Office Application Serial No. 10-2013-7020910, Notice of Allowance dated Aug. 19, 2014, 2 pages.

*Primary Examiner* — Brian D Nguyen
(74) *Attorney, Agent, or Firm* — Lee, Hong, Degerman, Kang & Waimey

(57) ABSTRACT

Provided are a method and apparatus for scheduling in a carrier aggregation system. The method includes: transmitting information for indicating a plurality of secondary cells to be scheduled through a joint coded control channel by using a higher layer signal; transmitting a separate coded control channel for scheduling a primary cell; and transmitting one joint coded control channel for scheduling the plurality of secondary cells, wherein the separate coded control channel is a control channel for scheduling one data channel transmitted through the primary cell, and the joint coded control channel is a control channel for scheduling the plurality of data channels transmitted through the plurality of secondary cells.

14 Claims, 11 Drawing Sheets

(56) References Cited

U.S. PATENT DOCUMENTS

| | | | |
|---|---|---|---|
| 2010/0296473 A1* | 11/2010 | Kim et al. | 370/329 |
| 2010/0303011 A1* | 12/2010 | Pan et al. | 370/328 |
| 2010/0303039 A1* | 12/2010 | Zhang et al. | 370/331 |
| 2011/0013581 A1* | 1/2011 | Lee et al. | 370/329 |
| 2011/0038331 A1* | 2/2011 | Chmiel et al. | 370/329 |
| 2012/0099553 A1* | 4/2012 | Aiba et al. | 370/329 |
| 2012/0127869 A1* | 5/2012 | Yin et al. | 370/252 |
| 2012/0140708 A1* | 6/2012 | Choudhury et al. | 370/328 |

FOREIGN PATENT DOCUMENTS

| | | |
|---|---|---|
| KR | 10-2010-0019336 | 2/2010 |
| KR | 10-2010-0019957 | 2/2010 |
| KR | 10-2010-0073992 | 7/2010 |
| KR | 10-2010-0131912 | 12/2010 |

* cited by examiner

METHOD AND DEVICE FOR SCHEDULING IN CARRIER AGGREGATION SYSTEM

CROSS-REFERENCE TO RELATED APPLICATIONS

This application is the National Stage filing under 35 U.S.C. 371 of International Application No. PCT/KR2012/000907, filed on Feb. 8, 2012, which claims the benefit of U.S. Provisional Application Ser. No. 61/440,388, filed on Feb. 8, 2011, the contents of which are all hereby incorporated by reference herein in their entirety.

TECHNICAL FIELD

The present invention relates to wireless communications, and more particularly, to a method and apparatus for scheduling in a wireless communication system supporting carrier aggregation.

BACKGROUND ART

One of the most important requirements of a next generation wireless communication system is to support a high data rate. For this, various techniques such as multiple input multiple output (MIMO), cooperative multiple point transmission (CoMP), relay, etc., have been under research, but the most fundamental and reliable solution is to increase a bandwidth.

However, a frequency resource is in a saturation state at present, and various schemes are partially used in a wide frequency band. For this reason, in order to ensure a broadband bandwidth to satisfy a required higher data rate, a system is designed such that a basic requirement which allows separate bands to operate respective independent systems is satisfied, and a carrier aggregation (CA) is introduced. In concept, the CA aggregates a plurality of bands into one system. In this case, a band that can be independently managed is defined as a component carrier (CC).

To support growing transmission capacity, it is considered in the latest communication standard (e.g., 3GPP LTE-A or 802.16m) to expand its bandwidth to 20 MHz or higher. In this case, a wideband is supported by aggregating one or more CCs. For example, if one CC corresponds to a bandwidth of 5 MHz, four carriers are aggregated to support a bandwidth of up to 20 MHz. A system supporting carrier aggregation in this manner is called a carrier aggregation system.

The conventional carrier aggregation system uses a structure in which one control channel corresponds to one data channel. That is, one physical downlink shared channel (PDSCH) and/or one physical uplink shared channel (PUSCH) are scheduled through one physical downlink control channel (PDCCH). However, a more effective scheduling method is required since a next-generation communication system may request real-time data communication and large-volume high-speed data transmission.

SUMMARY OF INVENTION

Technical Problem

The present invention provides a method and apparatus for scheduling in a carrier aggregation system.

Technical Solution

According to an aspect of the present invention, a method for scheduling in a carrier aggregation system is provided. The method includes: transmitting information for indicating a plurality of secondary cells to be scheduled through a joint coded control channel by using a higher layer signal; transmitting a separate coded control channel for scheduling a primary cell; and transmitting one joint coded control channel for scheduling the plurality of secondary cells, wherein the separate coded control channel is a control channel for scheduling one data channel transmitted through the primary cell, and the joint coded control channel is a control channel for scheduling the plurality of data channels transmitted through the plurality of secondary cells.

In the aforementioned aspect of the present invention, the higher layer signal may be a radio resource control (RRC) message.

In addition, the separate coded control channel and the joint coded control channel may be transmitted through a primary downlink component carrier constituting the primary cell.

In addition, the joint coded control channel may include a plurality of control information fields, and at least one of the plurality of control information fields may include a control value commonly applied to the plurality of secondary cells.

In addition, the joint coded control channel may use only a downlink control information format for scheduling a specific number of secondary cells.

In addition, the primary cell and the plurality of secondary cells may use a time division duplex (TDD) frame, and may be applied with different TDD configurations.

In addition, if the plurality of secondary cells are applied with the different TDD configurations, the plurality of secondary cells may be scheduled by the joint coded PDCCH only when all of identical subframes of the plurality of secondary cells are downlink subframes or uplink subframes.

In addition, if a semi-persistent scheduling (SPS) serving cell for performing semi-persistent scheduling exists among the plurality of secondary cells, a release of semi-persistent scheduling of the SPS serving cell may be indicated by combining control information for scheduling the SPS serving cell in the joint coded PDCCH.

In addition, the higher layer signal may further include information indicating a serving cell for transmitting the joint coded control channel.

In addition, the joint coded control channel may use only some control channel element (CCE) aggregation levels among CCE aggregation levels used in the separate coded control channel.

In addition, the joint coded control channel may be transmitted in a common search space for transmitting control information common to all user equipments in the primary cell.

In addition, a plurality of data channels to be scheduled by the joint coded control channel may include data channels transmitted through identical subframes of the plurality of secondary cells.

In addition, a plurality of data channels to be scheduled by the joint coded control channel may include data channels transmitted through different subframes of at least one secondary cell among the plurality of secondary cells.

According to another aspect of the present invention, a method for operating a user equipment in a wireless communication system is provided. The method includes: receiving information indicating a plurality of subframes to be scheduled through a joint coded control channel; receiving a separate coded control channel for scheduling one subframe; and receiving a data channel through the plurality of subframes and/or the single subframe, wherein the separate coded control channel is a control channel for scheduling a data channel transmitted through the single subframe, and wherein the joint coded control channel is a control channel for scheduling a plurality of data channels transmitted through the plurality of subframes.

In the aforementioned aspect of the present invention, the single subframe and the plurality of subframes may be included in the same serving cell.

In addition, the separate coded control channel and the joint coded control channel may be included in the same subframe of the same serving cell.

In addition, a subframe scheduled by the joint coded control channel may be a subframe that can be configured as a downlink subframe or an uplink subframe.

According to another aspect of the present invention, a method for operating a user equipment in a carrier aggregation system is provided. The method includes: receiving information for indicating a plurality of secondary cells to be scheduled through a joint coded control channel by using a higher layer signal; receiving a separate coded control channel for scheduling a primary cell; receiving one joint coded control channel for scheduling the plurality of secondary cells; receiving a data channel of the primary cell by using the separate coded control channel; and receiving a data channel of the plurality of secondary cells by using the joint coded control channel, wherein the separate coded control channel is a control channel for scheduling one data channel transmitted through the primary cell, and the joint coded control channel is a control channel for scheduling the plurality of data channels transmitted through the plurality of secondary cells.

According to another aspect of the present invention, there is provided an apparatus including: a radio frequency (RF) unit for transmitting and receiving a radio signal; and a processor coupled to the RF unit, wherein the processor transmits information for indicating a plurality of secondary cells to be scheduled through a joint coded control channel by using a higher layer signal, transmits a separate coded control channel for scheduling a primary cell, and transmits one joint coded control channel for scheduling the plurality of secondary cells, and wherein the separate coded control channel is a control channel for scheduling one data channel transmitted through the primary cell, and the joint coded control channel is a control channel for scheduling the plurality of data channels transmitted through the plurality of secondary cells.

Advantageous Effects

According to the present invention, a plurality of serving cells can be scheduled in a carrier aggregation system while minimizing an increase in the number of blind decoding attempts of a user equipment. Therefore, it is possible to perform scheduling capable of real-time data transmission and high-speed data transmission.

MODE FOR INVENTION

Long term evolution (LTE) of the $3^{rd}$ generation partnership project (3GPP) standard organization is a part of an evolved-universal mobile telecommunications system (E-UMTS) using an evolved-universal terrestrial radio access network (E-UTRAN). The LTE employs an orthogonal frequency division multiple access (OFDMA) in a downlink and employs single carrier-frequency division multiple access (SC-FDMA) in an uplink. LTE-advance (LTE-A) is an evolution of the LTE. For clarity, the following description will focus on the 3GPP LTE/LTE-A. However, technical features of the present invention are not limited thereto.

Figure 1:
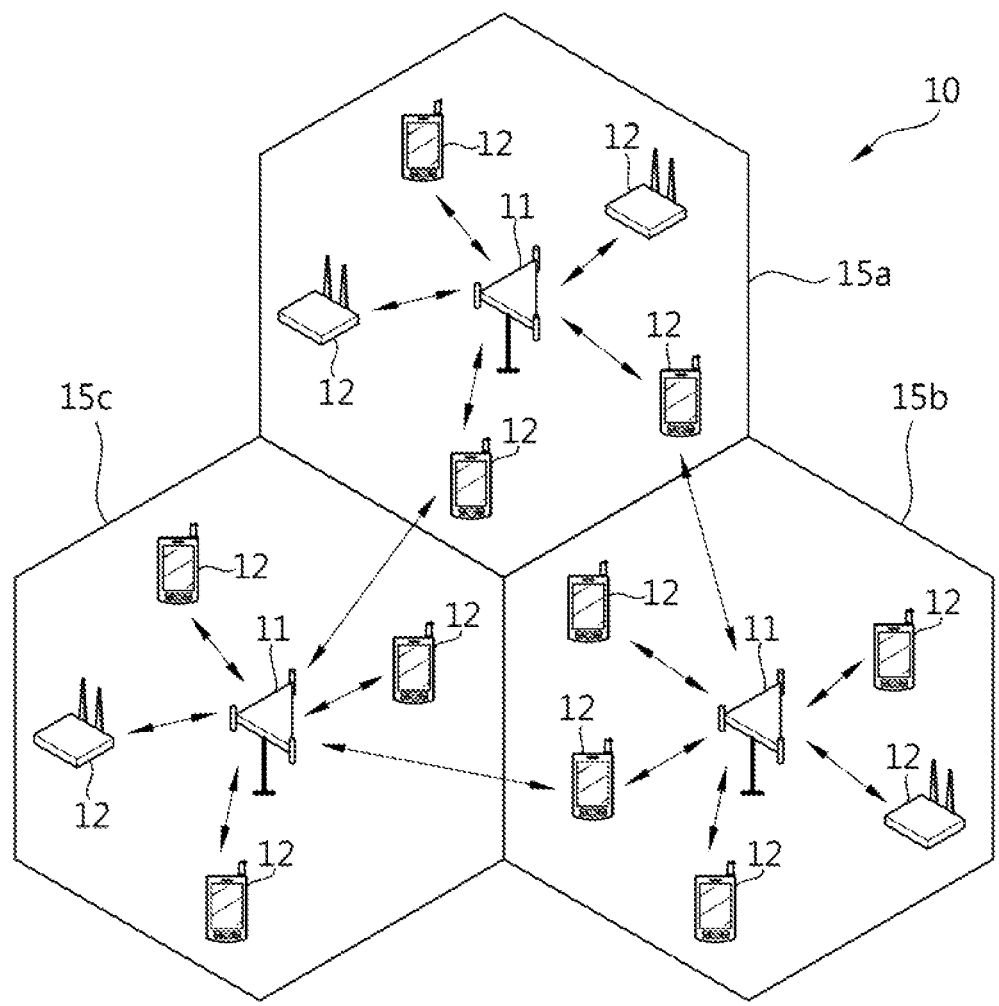
FIG. 1 shows a wireless communication system.

FIG. 1 shows a wireless communication system.

Referring to FIG. 1, a wireless communication system 10 includes at least one base station (BS) 11. Each BS 11 provides a communication service to a specific geographical region. The geographical region can be divided into a plurality of sub-regions 15a, 15b, and 15c, each of which is called a sector. The BS 11 is generally a fixed station that communicates with a user equipment (UE) 12 and may be referred to as another terminology, such as an evolved node-B (eNB), a base transceiver system (BTS), an access point, an access network (AN), etc.

The user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc.

Hereinafter, a downlink (DL) implies communication from the BS 11 to the UE 12, and an uplink (UL) implies communication from the UE 12 to the BS 11.

The wireless communication system 10 may be a system supporting bidirectional communication. The bidirectional communication may be performed by using a time division duplex (TDD) mode, a frequency division duplex (FDD) mode, etc. When in the TDD mode, UL transmission and DL transmission use different time resources. When in the FDD mode, UL transmission and DL transmission use different frequency resources. The BS 11 and the UE 12 can communicate with each other by using a radio resource called a radio frame.

Figure 2:
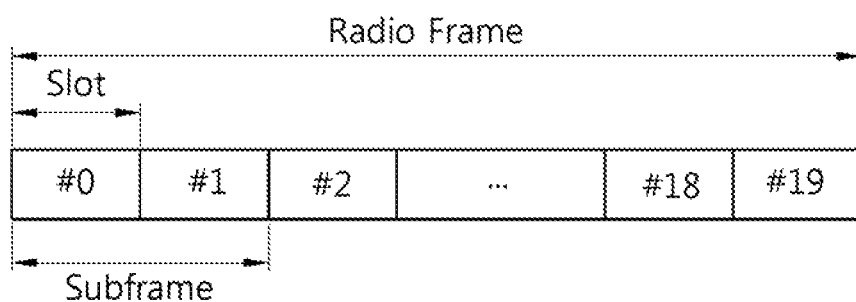
FIG. 2 shows a radio frame structure.

FIG. 2 shows a radio frame structure.

Referring to FIG. 2, a radio frame consists of 10 subframes in a time domain. One subframe consists of 2 slots in the time domain. One subframe may have a length of 1 millisecond (ms), and one slot may have a length of 0.5 ms. A time for transmitting one subframe is defined as a transmission time interval (TTI). The TTI may be a minimum unit of scheduling.

One slot may include a plurality of orthogonal frequency division multiplexing (OFDM) symbols in the time domain. Since the 3GPP LTE uses OFDMA in a downlink, one symbol period is represented with the OFDM symbol. The OFDM symbol can be referred to as other terms according to a multiple access scheme. For example, the OFDM symbol can also be referred to as an SC-FDMA symbol when SC-FDMA is used as an uplink multiple-access scheme. Although it is described herein that one slot includes 7 OFDM symbols, the number of OFDM symbols included in one slot may change depending on a cyclic prefix (CP) length. According to 3GPP TS 36.211 V8.5.0 (2008 December), in case of a normal CP, one subframe includes 7 OFDM symbols, and in case of an extended CP, one subframe includes 6 OFDM symbols. The radio frame structure is for exemplary purposes only, and thus the number of subframes included in the radio frame and the number of slots included in the subframe may change variously.

Figure 3:
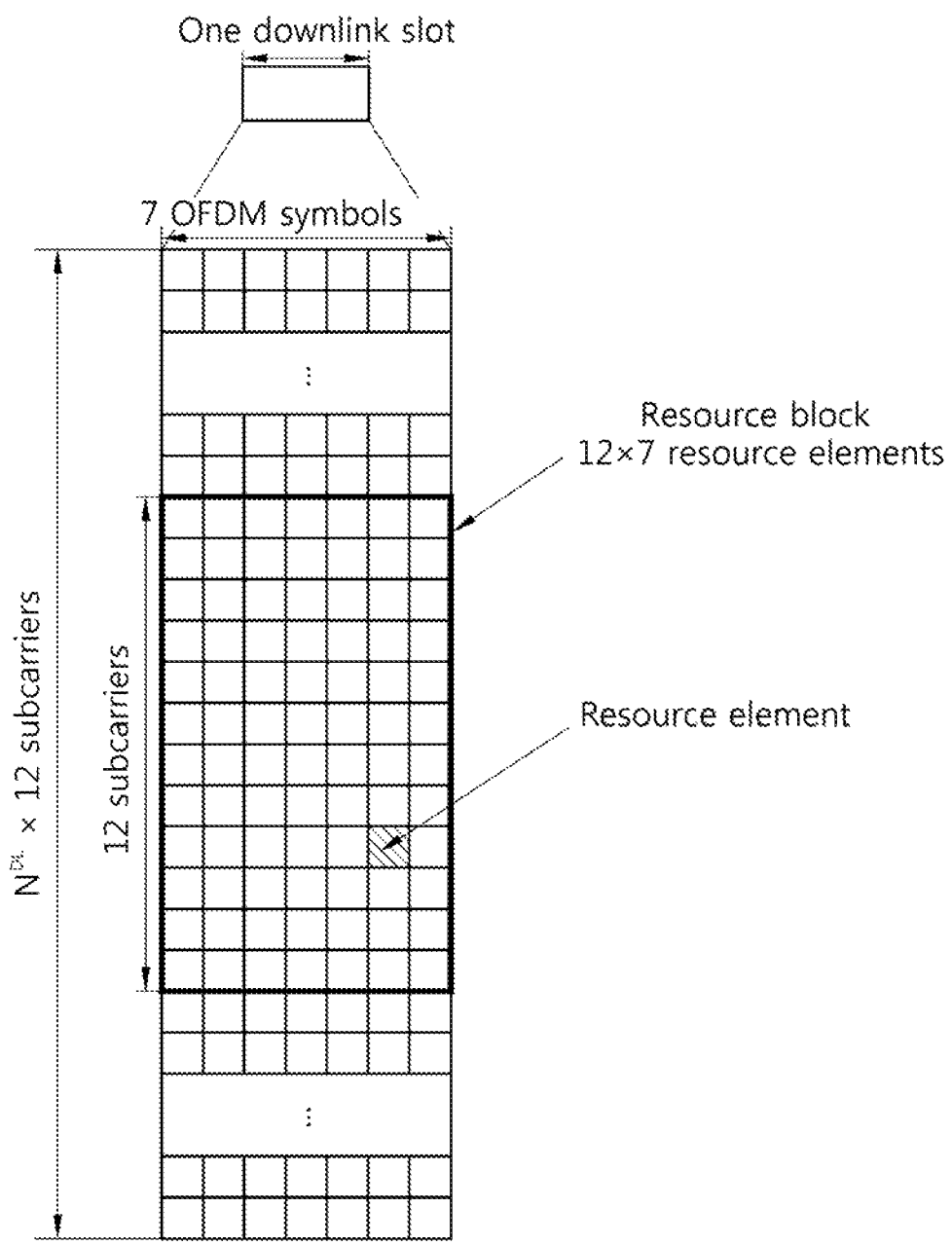
FIG. 3 shows an example of a resource grid for one downlink slot.

FIG. 3 shows an example of a resource grid for one DL slot.

Referring to FIG. 3, the DL slot includes a plurality of OFDM symbols in a time domain, and includes $N_{RB}$ resource blocks (RBs) in a frequency domain. The RB includes one slot in the time domain in a unit of resource allocation, and includes a plurality of consecutive subcarriers in the frequency domain. The number $N_{RB}$ of RBs included in the DL slot depends on a DL transmission bandwidth configured in a cell. For example, in the LTE system, $N_{RB}$ may be any one value in the range of 6 to 110. A structure of a UL slot may be the same as the aforementioned structure of the DL slot.

Each element on the resource grid is referred to as a resource element (RE). The RE on the resource grid can be identified by an index pair (k,l) within the slot. Herein, k (k= 0, ..., $N_{RB} \times 12-1$) denotes a subcarrier index in the frequency domain, and l (l=0, ..., 6) denotes an OFDM symbol index in the time domain.

Although it is described in FIG. 3 that one RB consists of 7 OFDM symbols in the time domain and 12 subcarriers in the frequency domain and thus includes 7×12 REs, this is for exemplary purposes only. Therefore, the number of OFDM symbols and subcarriers in the RB are not limited thereto. The number of OFDM symbols and the number of subcarriers may change variously depending on a CP length, a frequency spacing, etc. The number of subcarriers in one OFDM symbol may be any one value selected from 128, 256, 512, 1024, 1536, and 2048.

Figure 4:
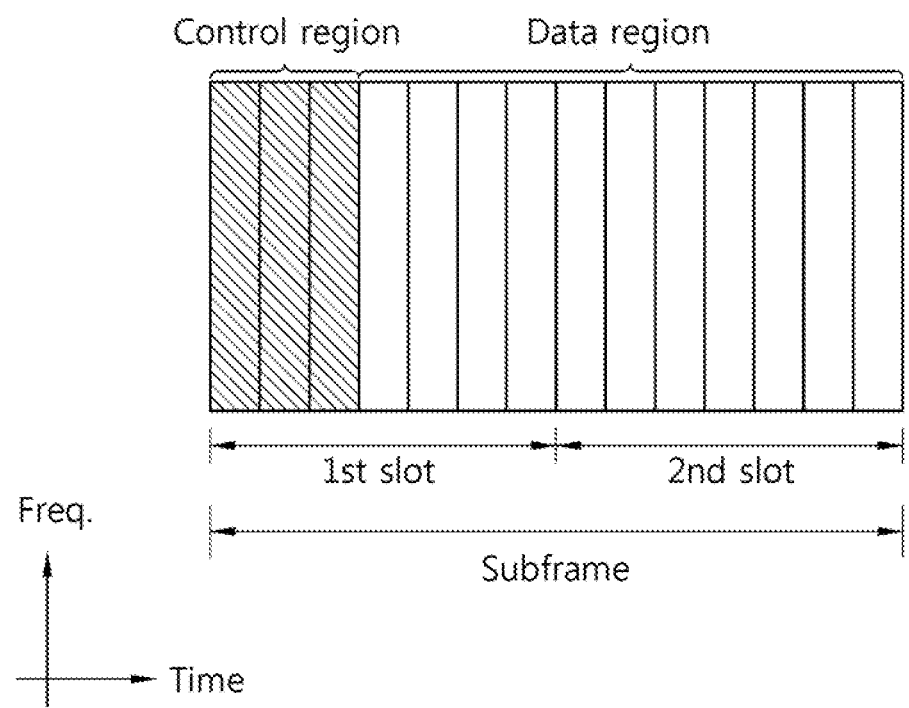
FIG. 4 shows a structure of a downlink subframe in $3^{rd}$ generation partnership project (3GPP) long term evolution (LTE).

FIG. 4 shows a structure of a DL subframe in 3GPP LTE. The subframe includes two consecutive slots. A maximum of three OFDM symbols located in a front portion of a $1^{st}$ slot in the DL subframe correspond to a control region to which a physical downlink control channel (PDCCH) is allocated. The remaining OFDM symbols correspond to a data region to which a physical downlink shared channel (PDSCH) is allocated. Herein, the control region includes 3 OFDM symbols for exemplary purposes only.

In addition to the PDCCH, control channels such as a physical control format indicator channel (PCFICH), a physical hybrid automatic repeat request (HARQ) indicator channel (PHICH), etc., can be allocated to the control region. A UE can read data information transmitted through the data channel by decoding control information transmitted through the PDCCH. The PDCCH will be described below in detail. The number of OFDM symbols included in the control region of the subframe can be known by using the PCFICH. The PHICH carries a hybrid automatic repeat request (HARQ) acknowledgement (ACK)/negative-acknowledgment (NACK) signal in response to the UL transmission. The PDSCH can be allocated to the data region.

[PDCCH Structure]

The control region consists of a logical control channel element (CCE) stream which is a plurality of CCEs. The CCE corresponds to a plurality of resource element groups (REGs). For example, the CCE may correspond to 9 REGs. The REG is used to define mapping of a control channel to a resource element. For example, one REG may consist of four resource elements. The CCE stream denotes a set of all CCEs constituting the control region in one subframe.

A plurality of PDCCHs may be transmitted in the control region. The PDCCH is transmitted on an aggregation of one or several consecutive CCEs. A PDCCH format and the number of available PDCCH bits are determined according to the number of CCEs constituting the CCE aggregation. Hereinafter, the number of CCEs used for PDCCH transmission is referred to as a CCE aggregation level. In addition, the CCE aggregation level is a CCE unit for searching for the PDCCH. A size of the CCE aggregation level is defined by the number of contiguous CCEs. For example, the CCE aggregation level may be defined as a specific number of CCEs, where the specific number is selected from {1, 2, 4, 8}.

Table 1 below shows examples of the PDCCH format and the number of available PDCCH bits according to the CCE aggregation level.

TABLE 1

| PDCCH format | CCE aggregation level | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Control information transmitted through the PDCCH is referred to as downlink control information (hereinafter, DCI). The DCI transmits UL scheduling information (called a UL grant), DL scheduling information (or called a DL grant), a UL power control command, control information for paging, control information for indicating a random access channel (RACH) response, etc.

The DCI can be transmitted with a specific format, and its usage can be defined according to each DCI format. For example, the usage of the DCI format can be classified as shown in Table 2 below.

TABLE 2

| DCI format | Contents |
| --- | --- |
| DCI format 0 | It is used for PUSCH scheduling. |
| DCI format 1 | It is used for scheduling of one PDSCH codeword. |
| DCI format 1A | It is used for compact scheduling and random access process of one PDSCH codeword. |
| DCI format 1B | It is used in simple scheduling of one PDSCH codeword having precoding information. |
| DCI format 1C | It is used for very compact scheduling of one PDSCH codeword. |
| DCI format 1D | It is used for simple scheduling of one PDSCH codeword having precoding and power offset information. |
| DCI format 2 | It is used for PDSCH scheduling of UEs configured to a closed-loop spatial multiplexing mode. |
| DCI format 2A | It is used for PDSCH scheduling of UEs configured to an open-loop spatial multiplexing mode. |
| DCI format 3 | It is used for transmission of a TPC command of a PUCCH and a PUSCH having a 2-bit power adjustment. |
| DCI format 3A | It is used for transmission of a TPC command of a PUCCH and a PUSCH having a 1-bit power adjustment. |
| DCI format 4 | It is used for PUSCH scheduling in one UL cell in a multi-antenna Tx mode. |

The DCI format may include various fields. Fields included in each DCI format are called control information fields. For example, the DCI format may include control information fields as described below.

[DCI Format 0]

A DCI format 0 is used for PUSCH scheduling. Examples of information (field) transmitted by using the DCI format 0 are as follows.

1) a flag for identifying the DCI format 0 and a DCI format 1A (if the flag is 0, it indicates the DCI format 0, and if the flag is 1, it indicates the DCI format 1A), 2) a hopping flag (1 bit), 3) a resource block designation and a hopping resource allocation, 4) a modulation and coding scheme and a redundancy version (5 bits), 5) a new data indicator (1 bit), 6) a TPC command (2 bits) for a scheduled PUSCH, 7) a cyclic shift (3 bits) for DM-RS, 8) a UL index, 9) a DL designation index (only in a TDD), 10) CQI request, etc. If the number of information bits in the DCI format 0 is less than a payload size of the DCI format 1A, '0' is padded so that it is equal to the payload size of the DCI format 1A.

[DCI Format 1]

A DCI format 1 is used for one PDSCH codeword scheduling. Examples of information transmitted in the DCI format 1 are as follows.

1) a resource allocation header (indicating a resource allocation type 0/type 1)—if a DL bandwidth is less than 10 PRBs, the resource allocation header is not included and the resource allocation type 0 is assumed, 2) a resource block designation, 3) a modulation and coding scheme, 4) an HARQ process number, 5) a new data indicator, 6) a redundancy version, 7) a TPC command for a PUCCH, 8) a DL designation index (only in a TDD), etc. If the number of information bits of the DCI format 1 is equal to that of the DCI format 0/1A, one bit having a value of '0' is added to the DCI format 1. If the number of information bits in the DCI format 1 is equal to any one of $\{12, 14, 16, 20, 24, 26, 32, 40, 44, 56\}$, a bit having one or more values of '0' is added to the DCI format 1 so that it is different from $\{12, 14, 16, 20, 24, 26, 32, 40, 44, 56\}$ and has a payload size different from that of the DCI format 0/1A.

The PDCCH can be generated through the following process. A BS attaches a cyclic redundancy check (CRC) for error detection to DCI to be transmitted to a UE. The CRC is masked with an identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message transmitted through a paging channel (PCH), a paging indicator identifier (e.g., paging-RNTI (P-RNTI)) may be masked to the CRC. If the PDCCH is for system information transmitted through a DL-SCH, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC. When the C-RNTI is used, the PDCCH carries control information for a corresponding specific UE. When other RNTIs are used, the PDCCH carries common control information received by all UEs in a cell.

Thereafter, channel coding is performed on the CRC-attached control information to generate coded data. Then, rate matching is performed according to a CCE aggregation level assigned to the PDCCH format. Thereafter, the coded data is modulated to generate modulation symbols. The number of modulation symbols constituting one PDCCH may differ depending on a CCE aggregation level (i.e., one value selected from 1, 2, 4, and 8). The modulation symbols are mapped to physical resource elements (REs) (i.e., CCE to RE mapping).

In the 3GPP LTE, the UE uses blind decoding for PDCCH detection. The blind decoding is a scheme in which a desired identifier is de-masked from a CRC of a received PDCCH (referred to as a candidate PDCCH) and an CRC error is checked to determine whether the PDCCH is its own control channel. The blind decoding is performed because the UE cannot know about a specific position in a control region in which its PDCCH is transmitted and about a specific CCE aggregation or DCI format used for PDCCH transmission.

As described above, a plurality of PDCCHs can be transmitted in one subframe. The UE monitors the plurality of PDCCHs in every subframe. Herein, monitoring is an operation in which the UE attempts PDCCH decoding according to a PDCCH format.

The 3GPP LTE uses a search space to reduce an overload caused by blind decoding. The search space can also be called a monitoring set of a CCE for the PDCCH. The UE monitors the PDCCH in the search space.

The search space is classified into a common search space (CSS) and a UE-specific search space (USS). The CSS is a space for searching for a PDCCH having common control information and consists of 16 CCEs indexed with 0 to 15. The CSS supports a PDCCH having a CCE aggregation level of $\{4, 8\}$. However, a PDCCH (e.g., DCI formats 0, 1A) for carrying UE-specific information can also be transmitted in the CSS. The USS supports a PDCCH having a CCE aggregation level of $\{1, 2, 4, 8\}$.

A start point of the search space is defined differently in the CSS and the USS. Although a start point of the CSS is fixed irrespective of a subframe, a start point of the USS may vary in every subframe according to a UE identifier (e.g., C-RNTI), a CCE aggregation level, and/or a slot number in a radio frame. If the start point of the USS exists in the CSS, the USS and the CSS may overlap with each other.

In a CCE aggregation level $L \in \{1,2,3,4\}$, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k + m) \bmod \lfloor N_{CCE,k}/L \rfloor\} + i \qquad \text{[Equation 1]}$$

Herein, $i=0, 1, \ldots, L-1$, $m=0, \ldots, M^{(L)}-1$, and $N_{CCE,k}$ denotes the total number of CCEs that can be used for PDCCH transmission in a control region of a subframe k. The control region includes a set of CCEs numbered from 0 to $N_{CCE,k}-1$. $M^{(L)}$ denotes the number of PDCCH candidates in a CCE aggregation level L of a given search space. In the CSS, $Y_k$ is set to 0 with respect to two aggregation levels L=4 and L=8. In the USS of the CCE aggregation level L, a variable $Y_k$ is defined by Equation 2 below.

$$Y_k = (A \cdot Y_{k-1}) \bmod D \qquad \text{[Equation 2]}$$

Herein, $Y_{-1} = n_{RNTI} \neq 0$, A=39827, D=65537, k=floor($n_s/2$), and $n_s$ denotes a slot number in a radio frame.

Table 3 below shows the number of PDCCHs in the search space.

TABLE 3

| PDCCH format | The number of CCEs | The number of candidate PDCCHs in CSS | The number of candidate PDCCHs in USS |
|---|---|---|---|
| 0 | 1 | — | 6 |
| 1 | 2 | — | 6 |
| 2 | 4 | 4 | 2 |
| 3 | 8 | 2 | 2 |

A DL transmission mode between a BS and a UE can be classified into 9 types as follows.

Transmission mode 1: A mode in which precoding is not performed (a single antenna port transmission mode).

Transmission mode 2: A transmission mode that can be used in 2 or 4 antenna ports using SFBC (transmit diversity).

Transmission mode 3: An open-loop mode in which rank adaptation based on RI feedback is possible (open-loop spatial multiplexing). The transmit diversity is applicable when a rank is 1. A great delay CDD can be used when the rank is greater than 1.

Transmission mode 4: A mode in which precoding feedback supporting dynamic rank adaptation is applied (closed-loop spatial multiplexing).

Transmission mode 5: Multi-user MIMO

Transmission mode 6: Closed-loop rank-1 precoding

Transmission mode 7: A transmission mode in which a UE-specific reference signal is used.

Transmission mode 8: Dual-layer transmission using antenna ports 7 and 8, or single-antenna port transmission using the antenna port 7 or the antenna port 8 (dual-layer transmission).

Transmission mode 9: Up to 8-layer transmission using antenna ports 7 to 14.

Table 4 below shows an example of a DCI format to be monitored by the UE according to the aforementioned DL transmission mode.

TABLE 4

| Transmission mode | DCI format to be monitored |
|---|---|
| 1. Single-antenna port; port 0 | DCI 0/1A, DCI 1 |
| 2. Transmit diversity | DCI 0/1A, DCI 1 |
| 3. Open-loop spatial multiplexing | DCI 0/1A, DCI 2A |
| 4. Close-loop spatial multiplexing | DCI 0/1A, DCI 2 |
| 5. Multi-user MIMO | DCI 0/1A, DCI 1D |
| 6. closed-loop rank = 1 precoding | DCI 0/1A, DCI 1B |
| 7. Single-antenna port; port 5 | DCI 0/1A, DCI 1 |

The UE may have to perform up to 44 blind decoding attempts. The UE receives information regarding a bandwidth of a carrier, a transmission mode, the number of antenna ports, etc., by using system information from the BS, and thus can know in advance a payload size of a PDCCH to be detected when performing blind decoding. The UE performs 44 blind decoding attempts in total, i.e., 32 (i.e., 16×2=32) attempts in the USS and 12 (i.e., 6×2=12) attempts in the CSS, for each of a DL and a UL with respect to the pre-known payload size of the PDCCH.

Figure 5:
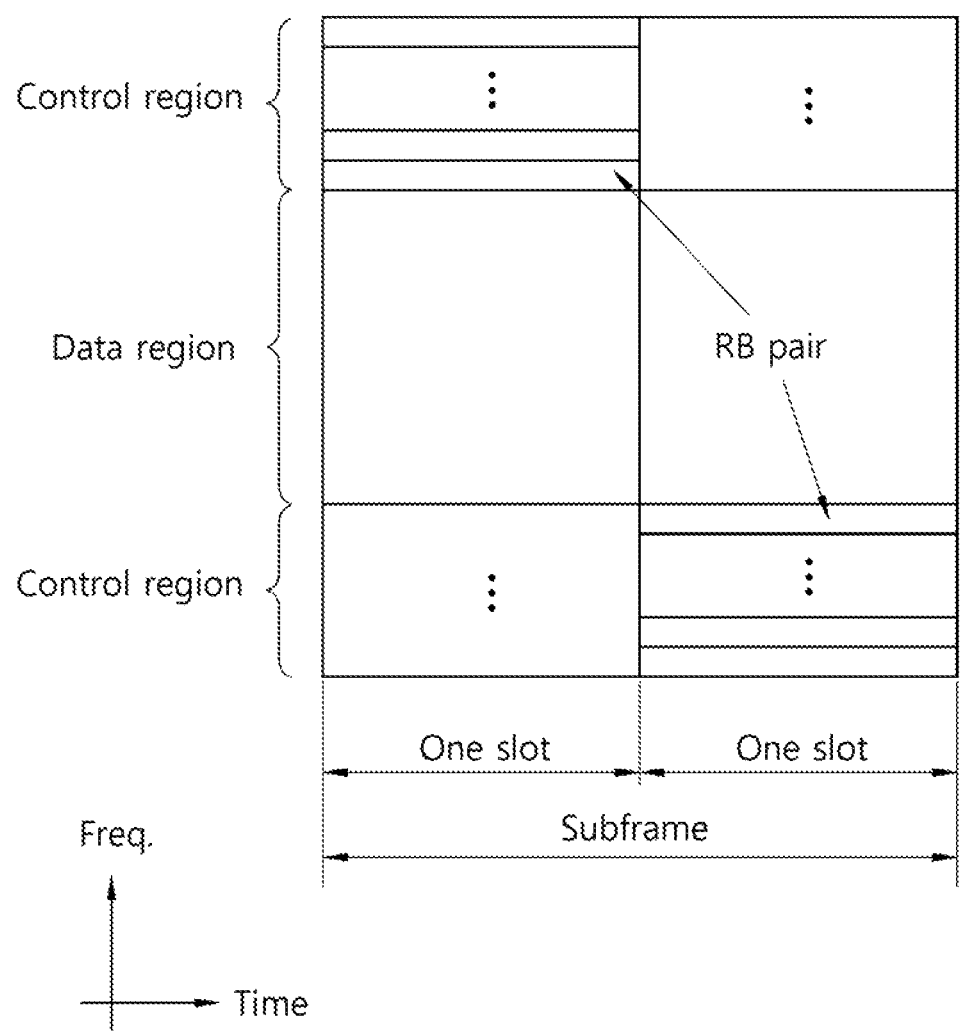
FIG. 5 shows a structure of an uplink subframe.

FIG. 5 shows a structure of a UL subframe.

Referring to FIG. 5, the UL subframe can be divided into a control region and a data region in a frequency domain. A physical uplink control channel (PUCCH) for transmitting UL control information is allocated to the control region. A physical uplink shared channel (PUSCH) for transmitting data (optionally, control information can be transmitted together) is allocated to the data region. According to a configuration, the UE may simultaneously transmit the PUCCH and the PUSCH, or may transmit any one of the PUCCH and the PUSCH.

The PUCCH for one UE is allocated in an RB pair in a subframe. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped in a slot boundary. By transmitting UL control information over time through different subcarriers, a frequency diversity gain can be obtained.

A hybrid automatic repeat request (HARQ) acknowledgement (ACK)/non-acknowledgment (NACK) and channel status information (CSI) indicating a DL channel status (e.g., channel quality indicator (CQI), a precoding matrix index (PMI), a precoding type indicator (PTI), a rank indication (RI), etc.) can be transmitted through the PUCCH. Periodic CSI can be transmitted through the PUCCH.

The PUSCH is mapped to an uplink shared channel (UL-SCH) which is a transport channel. UL data transmitted through the PUSCH may be a transport block which is a data block for the UL-SCH transmitted during a TTI. The transport block may include user data. Alternatively, the UL data may be multiplexed data. The multiplexed data may be obtained by multiplexing CSI and a transport block for the UL-SCH. Examples of the CSI multiplexed to the data may include a CQI, a PMI, an RI, etc. Alternatively, the UL data may consist of only CSI. Periodic or aperiodic CSI can be transmitted through the PUSCH.

Now, semi-persistent scheduling (SPS) will be described.

In LTE, a higher-layer signal such as radio resource control (RRC) can be used to report a UE about specific subframes in which semi-persistent transmission/reception is performed. Examples of a parameter given as the higher layer signal may be a subframe period and an offset value.

The UE recognizes semi-persistent transmission through RRC signaling, and thereafter performs or releases SPS PDSCH reception or SPS PUCCH transmission upon receiving an activation or release signal of SPS transmission through a PDCCH. That is, in a case where the activation or release signal is received through the PDCCH instead of directly performing SPS transmission even if SPS scheduling is assigned through RRC signaling, the UE applies a frequency resource (resource block) based on resource block allocation and a modulation and coding rate based on MCS information, which are designated in the PDCCH, and thus performs SPS transmission/reception in a subframe corresponding to an offset value and a subframe period assigned through RRC signaling.

If an SPS release signal is received through the PDCCH, SPS transmission/reception is suspended. Upon receiving a PDCCH including the SPS activation signal, the suspended SPS transmission/reception is resumed by using a frequency resource, MCS, etc., designated in the PDCCH.

The PDCCH for the SPS configuration/release can be called an SPS allocation PDCCH, and a PDCCH for a normal PUSCH can be called a dynamic PDCCH. When the following condition is satisfied, the UE can validate whether the PDCCH is the SPS allocation PDCCH. 1) CRC parity bits derived from a PDCCH payload must be scrambled with an SPS C-RNTI, and 2) a value of a new data indicator field must be '0'. In addition, when each field value of a PDCCH is determined as shown in the field value of Table 5 below with respect to each DCI format, the UE recognizes DCI information of the PDCCH as SPS activation or release.

TABLE 5

| | DCI format 0 | DCI format 1/1A | DCI format 2/2A/2B/2C |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |

TABLE 5-continued

|  | DCI format 0 | DCI format 1/1A | DCI format 2/2A/2B/2C |
|---|---|---|---|
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 5 above shows an example of a field value of an SPS allocation PDCCH for validating SPS activation.

TABLE 6

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

Table 6 above shows an example of a field value of an SPS release PDCCH for validating SPS release.

Now, a carrier aggregation system will be described.

[Carrier Aggregation System]

Figure 6:
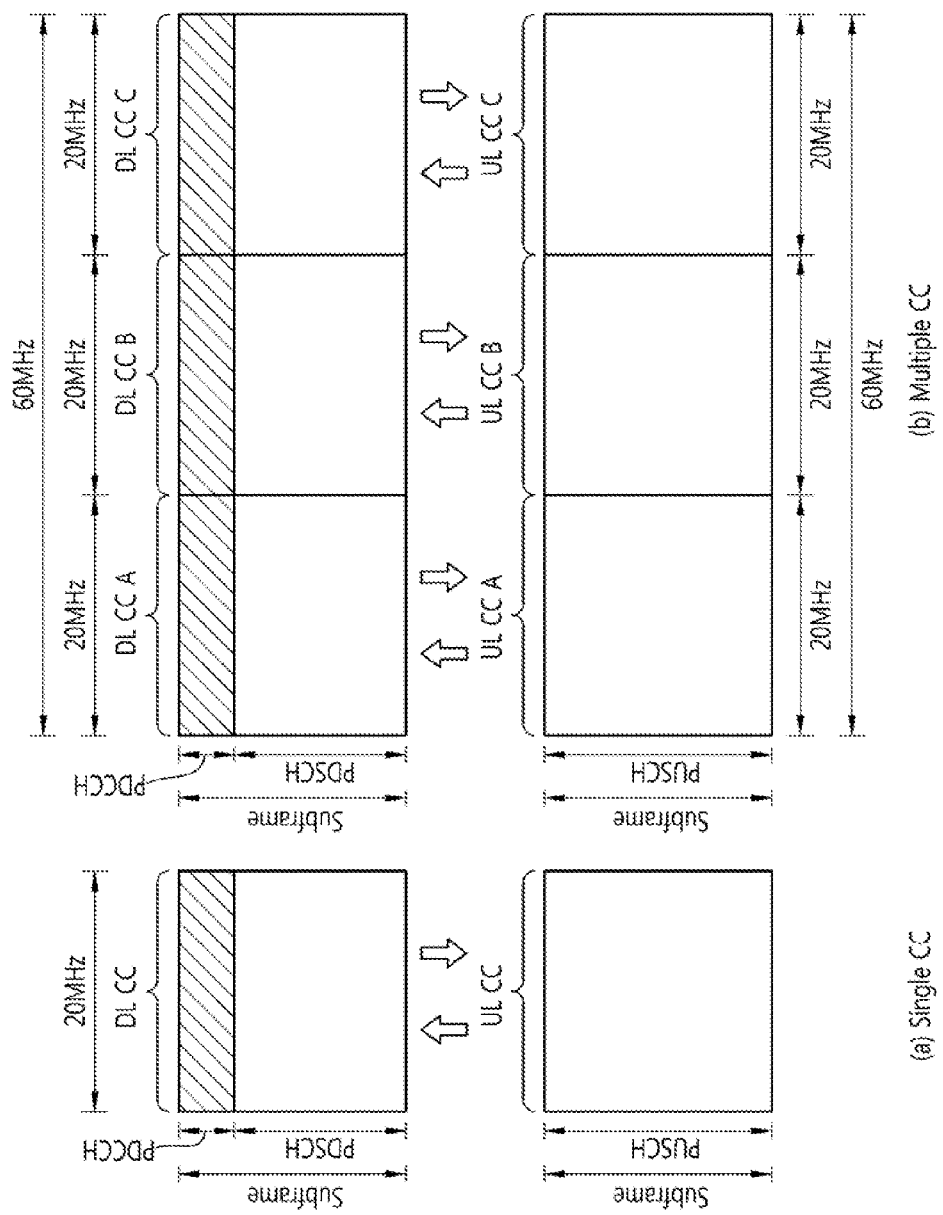
FIG. 6 shows an example of comparing a carrier aggregation system with the conventional single carrier system.

FIG. 6 shows an example of comparing a carrier aggregation system with the conventional single carrier system.

Referring to FIG. 6, the single-carrier system supports only one carrier for a UE in an uplink (UL) and a downlink (DL). Although the carrier may have various bandwidths, only one carrier is assigned to the UE. Meanwhile, the multiple-carrier system can assign multiple CCs, i.e., DL CCs A to C and UL CCs A to C, to the UE. For example, three 20 MHz CCs can be assigned to the UE to allocate a 60 MHz bandwidth.

The carrier aggregation system can be divided into a contiguous carrier aggregation system in which carriers to be aggregated are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

A system band of a wireless communication system is divided into a plurality of carrier frequencies. Herein, the carrier frequency implies a center frequency of a cell. Hereinafter, the cell may imply a DL frequency resource and a UL frequency resource. Alternatively, the cell may also imply a combination of a DL frequency resource and an optional UL frequency resource. In general, if carrier aggregation (CA) is not considered, UL and DL frequency resources may always exist in pair in one cell.

In order to transmit and receive packet data via a specific cell, the UE first has to complete a configuration of the specific cell. Herein, the configuration implies a state in which system information required for data transmission and reception for the cell is completely received. For example, the configuration may include an overall procedure that requires common physical layer parameters necessary for data transmission and reception, MAC layer parameters, or parameters necessary for a specific operation in an RRC layer. A cell of which configuration is complete is in a state capable of immediately transmitting and receiving a packet upon receiving only information indicating that packet data can be transmitted.

The cell in a state of completing its configuration can exist in an activation or deactivation state. Herein, the activation implies that data transmission or reception is performed or is in a ready state. The UE can monitor or receive a control channel (i.e., PDCCH) and a data channel (i.e., PDSCH) of an activated cell in order to confirm a resource (e.g., frequency, time, etc.) allocated to the UE.

The deactivation implies that data transmission or reception is impossible and measurement or transmission/reception of minimum information is possible. The UE can receive system information (SI) required to receive a packet from a deactivated cell. On the other hand, in order to confirm the resource (e.g., frequency, time, etc.) allocated to the UE, the UE does not monitor or receive a control channel (i.e., PDCCH) and a data channel (i.e., PDSCH) of the deactivated cell.

A cell can be classified into a primary cell, a secondary cell, and a serving cell.

The primary cell implies a cell that operates at a primary frequency. Further, the primary cell implies a cell in which the UE performs an initial connection establishment procedure or a connection re-establishment procedure with respect to the BS or a cell indicated as the primary cell in a handover procedure.

The secondary cell implies a cell that operates at a secondary frequency. Once an RRC connection is established, the secondary cell is used to provide an additional radio resource.

When carrier aggregation is not configured or when the UE cannot provide carrier aggregation, the serving cell is configured with the primary cell. If the carrier aggregation is configured, the term 'serving cell' indicates a cell configured for the UE, and can consist of a plurality of cells. One serving cell may consist of one DL CC or a pair of {DL CC, UL CC}. The plurality of serving cells can be configured with a set consisting of a primary cell and one or a plurality of cells among secondary cells.

A primary component carrier (PCC) denotes a CC corresponding to the primary cell. The PCC is a CC that establishes an initial connection (or RRC connection) with the BS among several CCs. The PCC serves for connection (or RRC connection) for signaling related to a plurality of CCs, and is a CC that manages UE context which is connection information related to the UE. In addition, the PCC establishes a connection with the UE, and thus always exists in an activation state when in an RRC connected mode. A DL CC corresponding to the primary cell is called a DL primary component carrier (DL PCC), and a UL CC corresponding to the primary cell is called a UL primary component carrier (UL PCC).

A secondary component carrier (SCC) implies a CC corresponding to the secondary cell. The SCC is a CC allocated to the UE in addition to the PCC. The SCC is an extended carrier used by the UE for additional resource allocation or the like in addition to the PCC, and can operate either in an activation state or a deactivation state. A DL CC corresponding to the secondary cell is called a DL secondary CC (DL SCC), and a UL CC corresponding to the secondary cell is called a UL secondary CC (UL SCC).

The primary cell and the secondary cell have the following features.

First, the primary cell is used for PUCCH transmission. Second, the primary cell is always activated, whereas the secondary cell relates to a carrier which is activated/deactivated according to a specific condition. Third, when the primary cell experiences a radio link failure (RLF), RRC re-connection is triggered, whereas when the secondary cell experiences the RLF, the RRC re-connection is not triggered. Fourth, the primary cell can change by a handover procedure accompanied by a random access channel (RACH) procedure or security key modification. Fifth, non-access stratum (NAS) information is received through the primary cell. Sixth, the primary cell always consists of a pair of a DL PCC and a UL PCC. Seventh, for each UE, a different CC can be configured as the primary cell. Eighth, a procedure such as reconfiguration, adding, and removal of the primary cell can be performed by an RRC layer. When adding a new secondary cell, RRC signaling can be used for transmission of system information of a dedicated secondary cell.

Regarding a CC constructing a serving cell, a DL CC can construct one serving cell, or the DL CC can be connected to a UL CC to construct one serving cell. However, the serving cell is not constructed only with one UL CC.

Activation/deactivation of a CC is equivalent in concept to activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated between a downlink and an uplink may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC (carrier #0)+20 MHz CC (carrier #1)+20 MHz CC (carrier #2)+20 MHz CC (carrier #3)+5 MHz CC (carrier #4).

As described above, the carrier aggregation system can support multiple CCs unlike a single carrier system.

The carrier aggregation system can support cross-carrier scheduling. The cross-carrier scheduling is a scheduling method capable of performing resource allocation of a PDSCH transmitted by using a different carrier through a PDCCH transmitted via a specific CC and/or resource allocation of a PUSCH transmitted via another CC other than a CC basically linked to the specific CC. That is, the PDCCH and the PDSCH can be transmitted through different DL CCs, and the PUSCH can be transmitted via a UL CC other than a UL CC linked to a DL CC on which a PDCCH including a UL grant is transmitted. As such, in a system supporting the cross-carrier scheduling, a carrier indicator is required to report a specific DL CC/UL CC used to transmit the PDSCH/ PUSCH for which the PDCCH provides control information. A field including the carrier indicator is hereinafter called a carrier indication field (CIF).

The carrier aggregation system supporting the cross-carrier scheduling may include a CIF in the conventional downlink control information (DCI) format. In a system supporting the cross-carrier scheduling, e.g., an LTE-A system, the CIF is added to the conventional DCI format (i.e., the DCI format used in LTE) and thus the number of bits can be extended by 3 bits, and the PDCCH structure can reuse the conventional coding scheme, resource allocation scheme (i.e., CCE-based resource mapping), etc.

Figure 7:
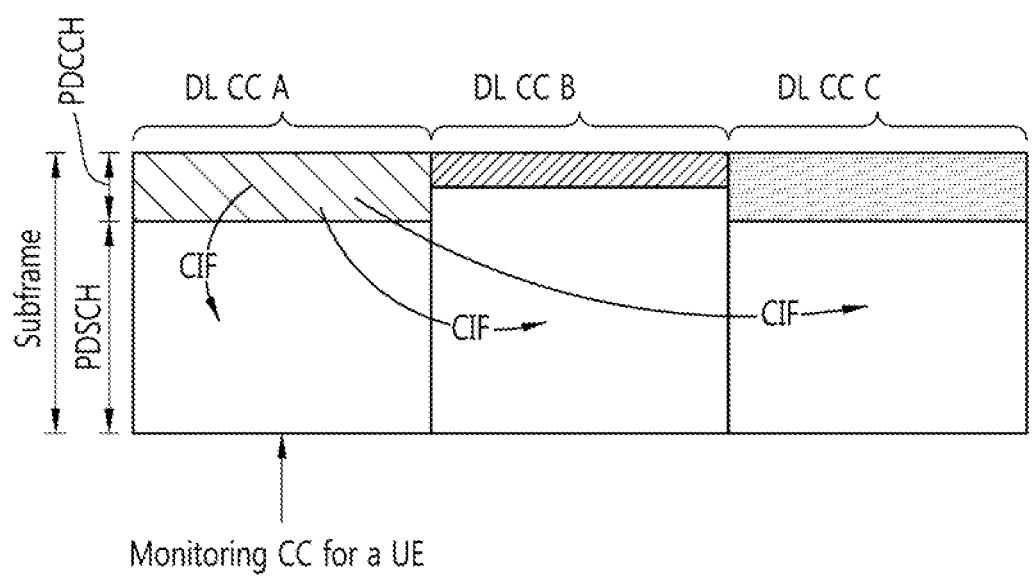
FIG. 7 shows a subframe structure for cross-carrier scheduling in a carrier aggregation system.

FIG. 7 shows a subframe structure for cross-carrier scheduling in a carrier aggregation system.

Referring to FIG. 7, a BS can determine a PDCCH monitoring DL CC set. The PDCCH monitoring DL CC set consists of some DL CCs among all aggregated DL CCs. When the cross-carrier scheduling is configured, a UE performs PDCCH monitoring/decoding only for a DL CC included in the PDCCH monitoring DL CC set. In other words, the BS transmits a PDCCH for a to-be-scheduled PDSCH/PUSCH only via a DL CC included in the PDCCL monitoring DL CC set. The PDCCH monitoring DL CC set can be determined in a UE-specific, UE group-specific, or cell-specific manner.

In the example of FIG. 7, 3 DL CCs (i.e., DL CC A, DL CC B, DL CC C) are aggregated, and the DL CC A is determined as the PDCCH monitoring DL CC. The UE can receive a DL grant for a PDSCH of the DL CC A, the DL CC B, and the DL CC C through the PDCCH. A CIF may be included in DCI transmitted through the PDCCH of the DL CC A to indicate a specific DL CC for which the DCI is provided.

Now, a method for scheduling in a carrier aggregation system will be described according to an embodiment of the present invention.

In an LTE-A system, a plurality of serving cells can be configured for one UE. That is, one UE can communicate with a BS through the plurality of serving cells. Therefore, in a single unit time (e.g., a subframe), a plurality of DL data channels can be scheduled or a plurality of UL data channels can be scheduled.

From the perspective of the BS, a plurality of data channels can be scheduled in the single unit time, and in this case, the following two-types of control channels can be used.

Figure 8:
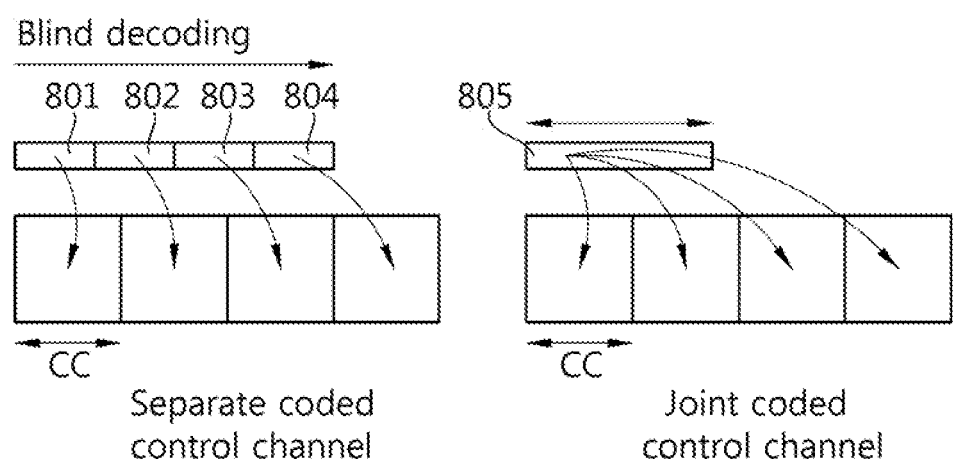
FIG. 8 shows two-types of control channels.

FIG. 8 shows two-types of control channels.

Referring to FIG. 8, the two-types of control channels are a separate coded control channel and a joint coded control channel.

1. Separate Coded Control Channel.

The separate coded control channel (e.g., separate coded PDCCHs 801, 802, 803, and 804) schedules one PDSCH or PUSCH. Therefore, the number of PDCCHs required to schedule a plurality of PDSCHs (or PUSCHs) is the same as the number of PDSCHs (or PUSCHs).

This method is configured such that one serving cell of the conventional LTE is extended to a plurality of serving cells in a parallel manner, and the number of PDCCHs is increased according to the number of serving cells to be scheduled. Therefore, advantageously, there is no need to determine a new control information format (e.g., a new DCI format) or it is enough to change the format to the minimum extent possible (e.g., a CIF is included in each DCI format). However, if a plurality of PDSCHs (or PUSCHs) are frequently scheduled, there is a disadvantage in that a PDCCH overhead is increased since the plurality of PDCCHs must be transmitted.

2. Joint Coded Control Channel.

The joint coded control channel, e.g., a joint coded PDCCH, schedules a plurality of PDSCHs (or PUSCHs)

through one PDCCH 805. For example, one PDCCH can be generated in such a manner that control fields of PDCCHs for the respective plurality of PDSCHs are arranged in parallel. In this case, a plurality of serving cells can be scheduled through one PDCCH irrespective of the number of serving cells actually scheduled.

When the joint coded PDCCH is used, for the effective use of a PDCCH resource, a control information format (i.e., a DCI format) needs to be changed according to the number of serving cells to be scheduled. In this case, there may be a disadvantage in that the number of blind decoding attempts is increased since blind decoding must be performed for each control information format.

However, in the case where the plurality of PDSCHs are frequently scheduled, a PDCCH overhead can be decreased by sharing information which overlaps for each serving cell.

For example, if the joint coded PDCCH corresponds to a DL grant, a field such as a transmission power control (TPC), an ACK/NACK resource indicator (ARI), etc., can be commonly used between serving cells. If the joint coded PDCCH corresponds to a UL grant, an aperiodic CSI trigger field can be commonly used. As such, since the control information field common to each serving cell can be transmitted through one control information field in the joint coded PDCCH, the PDCCH overhead can be decreased.

In addition, the joint coded PDCCH has an advantage in that the PDCCH overhead can be decreased by using a coding gain since a CRC overhead is decreased and a coding block size is increased in comparison with the separate coded PDCCH.

One joint coded PDCCH can schedule a plurality of serving cells, and also can schedule a plurality of subframes in one serving cell. In addition, it can be extended such that a plurality of subframes of a plurality of serving cells can be scheduled by using one joint coded PDCCH. That is, the plurality of PDSCHs (i.e., data channels) scheduled by the joint coded PDCCH (i.e., joint coded control channel) may include data channels transmitted through identical subframes of a plurality of secondary cells. Alternatively, the plurality of data channels scheduled by the joint coded control channel may include data channels transmitted through different subframes of at least one secondary cell among a plurality of secondary cells.

In LTE-A rel-10, it is specified that only the aforementioned separate coded PDCCH is used for the effective extension of an LTE system developed for transmission and reception of a single serving cell. However, in a future communication system, high-speed data transmission for large volume video data, a file transfer protocol (FTP), etc., may be requested at the same time of real-time data transmission such as an online game. Accordingly, a more effective data channel scheduling control method is required.

In the present invention, a method is proposed in which a BS basically uses a separate coded PDCCH suitable for scheduling of a small number of serving cells and scheduling is performed by additionally using a joint coded PDCCH suitable for scheduling of a plurality of serving cells or a plurality of subframes. Although the following description focuses on a case where one joint coded PDCCH is used to schedule subframes existing in a plurality of serving cells, the present invention is not limited thereto. Thus, the present invention can also be applied to a case where the joint coded PDCCH is used to schedule a plurality of subframes in one serving cell.

1. The joint coded PDCCH may exist independent of a UL CC/DL CC of each serving cell. That is, it can be used independently for the usage of a DL grant and a UL grant. Alternatively, the joint coded PDCCH may be used by combining the DL grant and the UL grant.

2. A DCI format transmitted through the joint coded PDCCH may use a fixed format which schedules a specific number (indicated by $N^{joint}_{CC}$) of serving cells (or CCs) or a specific number of subframes. For example, if the maximum number of serving cells that can be allocated to a UE is 5, a fixed DCI format which schedules 3 or 5 serving cells is defined, while the joint coded PDCCH may use only the DCI format defined above. In this case, since the number of DCI formats is decreased in comparison with a case of using a different DCI format for each of serving cells selected from 1 to 5 serving cells, an increase in the number of blind decoding attempts to be performed by the UE can be minimized.

$N^{joint}_{CC}$ serving cells/subframes to be scheduled may be equal to 1) the maximum number of serving cells that can be received (or transmitted) by the UE, 2) the number of activated serving cells/subframes, 3) the number of serving cells/subframes semi-persistently assigned by a BS through an RRC message or serving cells/subframes dynamically assigned through a PDCCH, and 4) the number of DL subframes mapped to one UL subframe. For example, the BS may transmit information indicating a bitmap or a CC combination to report the serving cells/subframes to be scheduled.

In a DCI format which schedules the $N^{joint}_{CC}$ serving cells/subframes, there may be a serving cell/subframe which has a control information field but is not actually scheduled. For example, there may be a case where the number of actually scheduled serving cells is 2 even if a DCI format which schedules 3 serving cells is used in the joint coded PDCCH. In this case, among DCI formats, some control information fields may not be actually used in scheduling even if the fields formally exist. In other words, regarding some serving cells/subframes, there may be a serving cell/subframe which has a control information field but is not actually scheduled.

The serving cell/subframe which is not actually scheduled among the $N^{joint}_{CC}$ serving cells may be reported by using a bitmap or by explicitly providing information indicating a combination of non-scheduled serving cells/subframes.

Alternatively, in the method of reporting the serving cell/subframe which is not actually scheduled among the $N^{joint}_{CC}$ serving cells, it may be indicated by combining serving cell/subframe-specific control information fields or it can be implicitly reported that a specific serving cell/subframe is not used by using a value not used in the specific control information field. For example, if a value (i.e., binary values which are all set to 1) which is not used as a resource indication value (RIV) is set in the resource allocation field, it may indicate that a corresponding specific serving cell/subframe is not used.

If a plurality of serving cells/subframes are scheduled by using a separate coded PDCCH, in comparison with a case where some separate coded PDCCHs are missed, ACK/NACK information for reporting whether normal reception is made in a scheduled serving cell/subframe may be determined according to a serving cell/subframe which can be scheduled to the maximum extent possible, irrespective of actual scheduling. On the other hand, if some serving cells/subframes are not scheduled in this manner, ACK/NACK information for reporting whether normal reception is made in a serving cell/subframe scheduled through a joint coded PDCCH can transmit only ACK/NACK information for an actually scheduled serving cell/subframe.

3. The joint coded PDCCH can be restricted to be used only in a specific subframe. In case of using a joint coded PDCCH for scheduling a plurality of serving cells, for example, a plurality of serving cells each of which uses a TDD frame may be assigned to a UE so that the TDD frame is configured differently in each serving cell. In TDD, a DL subframe and a UL subframe can exist in one radio frame. Table 7 below shows an example of a UL-DL configuration.

TABLE 7

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Different TDD frame configurations can be used. For example, a DL-UL configuration 1 is used in a serving cell #1, and a DL-UL configuration 2 is used in a serving cell #2. In this case, it may be restricted such that a joint coded PDCCH is used only in a case where all subframes of each serving cell are DL subframes.

In addition, a DCI format of the joint coded PDCCH may be applied differently for each subframe so as to be applied differently for each target subframe of a serving cell to be scheduled. The DCI format of the joint coded PDCCH is preferably configured according to the maximum number of codewords that can be scheduled through a serving cell to be scheduled.

In case of using a joint coded PDCCH for scheduling a plurality of serving cells, for example, it may be restricted in TDD such that the joint coded PDCCH is used only for a first DL subframe among a plurality of DL subframes mapped to one UL subframe. Herein, a mapping relation between a UL subframe and a DL subframe when the number of UL subframes differs from the number of DL subframes may imply a mapping relation based on a UL ACK/NACK response transmission time regarding data and control information transmitted in a DL subframe. In this case, a plurality of DL subframes may be mapped to one UL subframe.

4. If the joint coded PDCCH is used to schedule serving cells/subframes, a serving cell/subframe to be scheduled through a separate coded PDCCH may not be included. For example, if a primary cell is always scheduled through the separate coded PDCCH, the primary cell is not necessarily included in a serving cell to be scheduled by the joint coded PDCCH. If only the separate coded PDCCH for the primary cell is used in scheduling, a UE transmits only corresponding ACK/NACK by using an ACK/NACK resource/format for the primary cell. If the separate coded PDCCH for the primary cell is used simultaneously with the joint coded PDCCH in scheduling, the UE transmits all corresponding ACK/NACK by using ACK/NACK resources/formats for them. On the other hand, even if only the joint coded PDCCH is used in scheduling, in preparation for a case of missing the separate coded PDCCH for the primary cell, the UE may transmit ACK/NACK by configuring the ACK/NACK according to an ACK/NACK resource/format of the same method as that used in a case where the separate coded PDCCH for the primary cell is simultaneously used with the joint coded PDCCH in scheduling.

From the perspective of the UE, in case of detecting the joint coded PDCCH, blind decoding for the separate coded PDCCH may not be performed. The UE may feed back only an ACK/NACK bit corresponding to the number of codewords scheduled by the joint coded PDCCH. Meanwhile, if a PDSCH scheduled with SPS exists, the UE may transmit an ACK/NACK bit for an SPS PDSCH together with ACK/NACK corresponding to the number of codewords scheduled in the joint coded PDCCH.

Regarding a serving cell for performing SPS transmission/reception by considering a PDCCH for SPS activation/release or SPS retransmission, the separate coded PDCCH can be exceptionally used together with the joint coded PDCCH. Alternatively, only the separate coded PDCCH may be used in a serving cell for performing SPS transmission/reception.

In LTE-A rel-10, SPS transmission/reception is performed only through a primary cell. Therefore, the primary cell may be scheduled through the separate coded PDCCH, and a secondary cell may be scheduled through the joint coded PDCCH.

In a case where a serving cell for performing SPS transmission/reception (e.g., SPS PDSCH/PUCCH reception/transmission) is included among serving cells scheduled through the joint coded PDCCH, SPS activation/release can be indicated according to a specific state of a control information field of a corresponding serving cell or can be indicated by combining specific control information fields.

How to apply this method may be a matter to be considered in a case where the joint coded PDCCH includes scheduling information for a serving cell in which an SPS-PDSCH/PUSCH exists in a subframe in which an SPS-PDSCH/PUSCH exists.

For example, assume that the joint coded PDCCH is received in a subframe #1 of a serving cell #1 but the joint coded PDCCH schedules subframes #1 of a serving cell #3 to a serving cell #5. If an SPS-PDSCH/PUSCH exists in the subframe #1 of the serving cell #3, which transmission/reception method will be used by a UE is a matter to be considered.

In a first method, if the joint coded PDCCH includes scheduling information for a serving cell for performing SPS transmission/reception, transmission of the SPS-PDSCH/PUSCH is suspended in a corresponding subframe, and dynamic scheduling based on the joint coded PDCCH is used. If the joint coded PDCCH does not include the scheduling information for the serving cell for performing the SPS transmission/reception, the SPS-PDSCH/PUSCH is maintained.

In a second method, if the joint coded PDCCH includes the scheduling information for the serving cell for performing the SPS transmission/reception, the joint coded PDCCH is ignored in a corresponding subframe, and instead SPS transmission/reception is always maintained. For this, the joint coded PDCCH can transmit only scheduling information for serving cells other than a serving cell for performing the SPS transmission/reception in a subframe for performing the SPS transmission/reception.

5. If the joint coded PDCCH includes scheduling information for a UL-CC of a corresponding PUSCH in a DL subframe corresponding to a UL subframe in which a PUSCH capable of performing non-adaptive retransmission based on a PHICH NACK response, scheduling based on the joint coded PDCCH is used, and otherwise if it does not include the scheduling information of the UL-CC of the corresponding PUSCH, a non-adaptive retransmission PUSCH is maintained.

6. The joint coded PDCCH is primarily used for scheduling a plurality of serving cells/subframes, and thus an information amount is increased in comparison with the separate coded PDCCH. Therefore, the number of CCEs (i.e., a CCE aggregation level) occupied by a corresponding PDCCH may be restricted in comparison with the separate coded PDCCH.

For example, it may be restricted such that 4, 8, or higher levels can be used among the CCE aggregation levels used in the separate coded PDCCH.

In addition, the joint coded PDCCH can be used only in a common search space by considering that only 4 and 8 are used among the CCE aggregation levels in the common search space. Then, the number of blind decoding attempts of the UE can be minimized.

In order to decrease the number of blind decoding attempts of the UE, it may be specified such that the joint coded PDCCH is transmitted only in a search space configured for a specific CC or a specific CC group. For example, the specific CC may be a primary CC or a CC for transmitting system information, or may be a CC having a lowest index among CCs scheduled by the joint coded PDCCH. Alternatively, it may be restricted such that the joint coded PDCCH is transmitted only through a search space of a CC having a CC index configured using RRC.

In case of non-cross carrier scheduling, since one serving cell is extended in parallel in this structure, a PDCCH of each serving cell only schedules a serving cell for transmitting the PDCCH. To maintain such a feature, it may be configured such that the joint coded PDCCH is used only in cross carrier scheduling, and is not used in non-cross carrier scheduling.

Hereinafter, an example of scheduling a carrier aggregation system by using the aforementioned joint coded PDCCH and separate coded PDCCH will be described.

Figure 9:
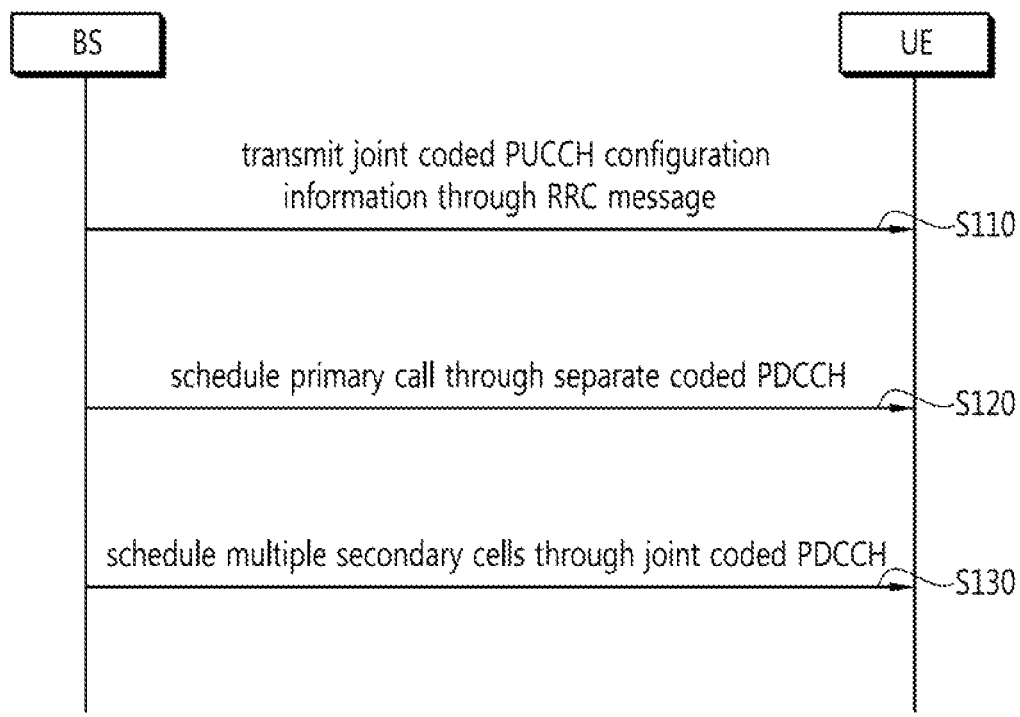
FIG. 9 shows a scheduling method according to an embodiment of the present invention.

FIG. 9 shows a scheduling method according to an embodiment of the present invention.

Referring to FIG. 9, a BS transmits joint coded PDCCH configuration information to a UE by using an RRC message (step S110). The joint coded PDCCH configuration information may include information indicating $N^{joint}_{CC}$ serving cells/subframes scheduled by a joint coded PDCCH, information indicating a serving cell/subframe for transmitting the joint coded PDCCH, information designating a DCI format by which the joint coded PDCCH is transmitted, etc.

The BS schedules a primary cell through a separate coded PDCCH (step S120). The separate coded PDCCH can be transmitted through the primary cell.

The BS schedules a plurality of secondary cells through the joint coded PDCCH (step S130). The joint coded PDCCH can also be transmitted through the primary cell. Alternatively, the joint coded PDCCH can be transmitted through a secondary cell indicated by an RRC message among the plurality of secondary cells.

If the primary cell is replaced with a specific subframe and the secondary call is replaced with a subframe other than the specific subframe in the above example, it can be considered as a situation in which a plurality of subframes are scheduled. Herein, the specific subframe may be a subframe designated such that the plurality of subframes are scheduled. Examples of the specific subframe may include a first DL subframe among a plurality of DL subframes mapped to one UL subframe, a subframe fixedly used as some DL subframes in a system which operates in a subframe in which a UL-DL configuration can be flexibly determined in TDD, and a subframe in which all subframes of each serving cell are DL subframes in a system which can have a different UL-DL configuration in TDD.

Figure 10:
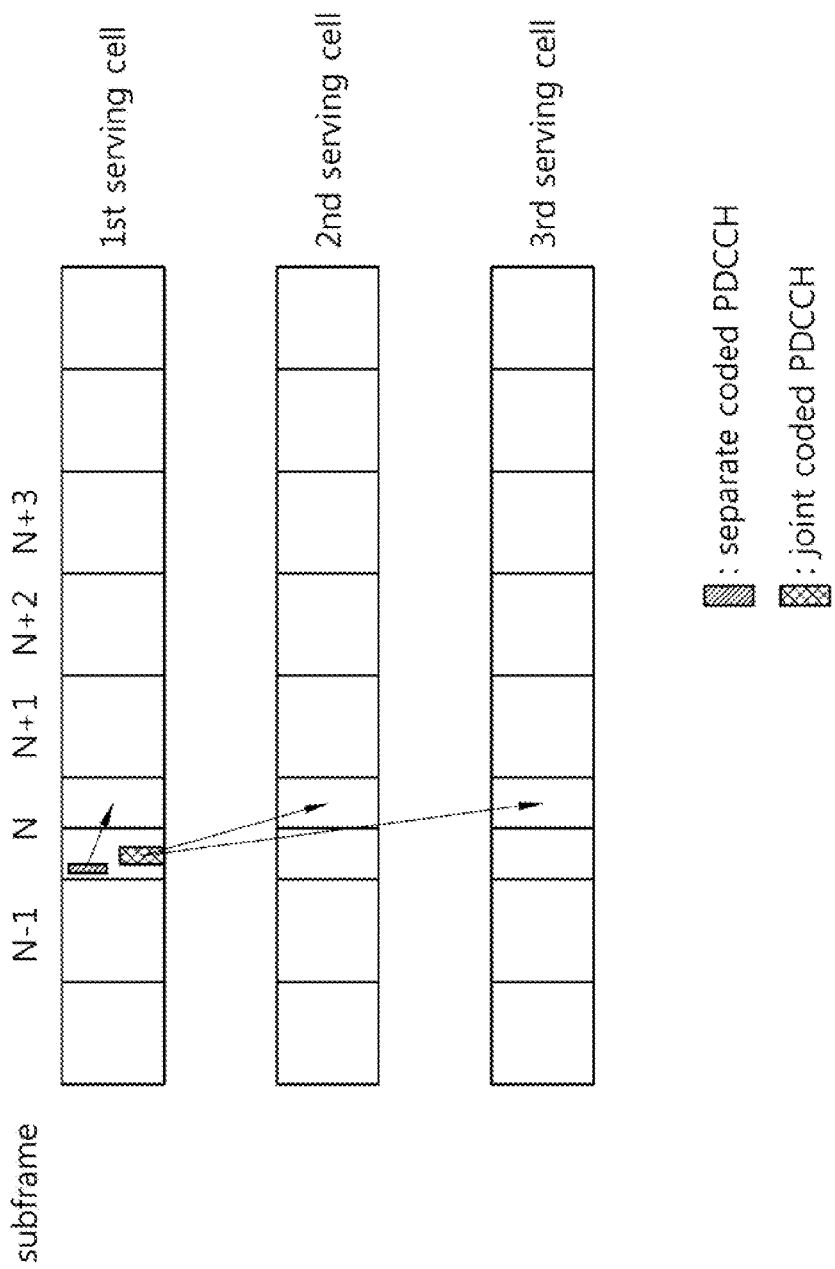
FIG. 10 shows an example of a scheduling method in a carrier aggregation system.

FIG. 10 shows an example of a scheduling method in a carrier aggregation system.

Referring to FIG. 10, a $1^{st}$ serving cell to a $3^{rd}$ serving cell are assigned to a UE. The UE receives a joint coded PDCCH and a separate coded PDCCH in a subframe #N of the $1^{st}$ serving cell.

In this case, the separate coded PDCCH may schedule a PDSCH of the subframe #N of the $1^{st}$ serving cell. In addition, the joint coded PDSCH may schedule PDSCHs of subframes #N of the $2^{nd}$ serving cell and the $3^{rd}$ serving cell.

The UE can receive a PDSCH by receiving a DL grant for two serving cells through the joint coded PDCCH. In this case, the number of blind decoding attempts is decreased in comparison with a case where two separate coded PDCCHs are blind-decoded to detect one joint coded PDCCH. In addition, since a control information field common to the two serving cells is shared, a payload size of the joint coded PDCCH is decreased in comparison with a case of joining two separate coded PDCCHs. Further, since CRC checking is performed on one joint coded PDCCH, an error checking time is also decreased. Therefore, the present invention is effective in real-time data transmission and large-volume high-speed data transmission.

In FIG. 10, the joint coded PDCCH schedules identical subframes (i.e., subframes having the same subframe index) included in a plurality of serving cells for example.

The present invention is also applicable when the joint coded PDCCH schedules a plurality of subframes existing in the same cell. In this case, the UE receives information indicating a plurality of subframes scheduled through the joint coded control channel (i.e., joint coded PDCCH) from the BS, and receives a separate coded control channel (i.e., separate coded PDCCH) for scheduling one subframe. Thereafter, a data channel (i.e., PDCCH) is received through the plurality of subframes and/or the single subframe. In this case, the separate coded control channel may be a control channel for scheduling a data channel transmitted through the single subframe, and the joint coded control channel may be a control channel for scheduling a plurality of data channels transmitted through the plurality of subframes.

In this case, the plurality of subframes scheduled by the joint coded control channel may be subframes that can be configured as a DL subframe or a UL subframe by DCI (i.e., DL grant or UL grant) transmitted through the joint coded control channel. Alternatively, the plurality of subframes may be subframes in which PDCCH detection is not attempted. In addition, a subframe to be scheduled by the separate coded control channel may be a subframe configured as a DL subframe or a UL subframe semi-persistently or fixedly, or may be a subframe in which PDCCH detection is attempted.

In addition, the single subframe and the plurality of subframes may be included in the same serving cell, and the separate coded control channel and the joint coded control channel may be included in the same subframe of the same serving cell.

Figure 11:
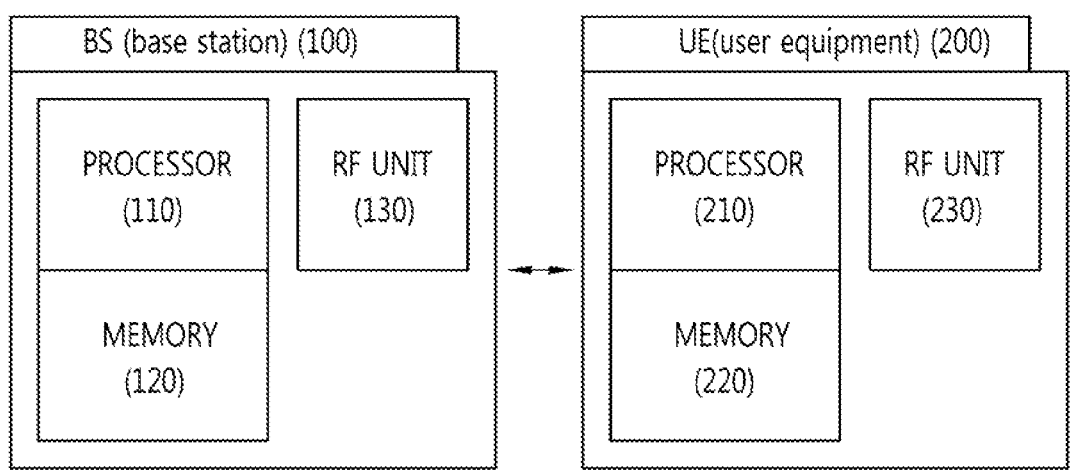
FIG. 11 shows a structure of a base station and a user equipment according to an embodiment of the present invention.

FIG. 11 shows a structure of a BS and a UE according to an embodiment of the present invention.

A BS 100 includes a processor 110, a memory 120, and a radio frequency (RF) unit 130. The processor 110 implements the proposed functions, procedures, and/or methods. For example, the processor 110 transmits, to the UE, information for indicating a plurality of secondary cells to be scheduled through a joint coded control channel by using a higher layer signal, and transmits a separate coded control channel for scheduling a primary cell. Further, the processor 110 transmits one joint coded control channel for scheduling the plurality of secondary cells. The memory 120 coupled to the processor 110 stores a variety of information for driving the processor 110. The RF unit 130 coupled to the processor 110 transmits and/or receives a radio signal.

A UE 200 includes a processor 210, a memory 220, and an RF unit 230. The processor 210 implements the proposed functions, procedure, and/or methods. For example, the processor 210 receives, from the BS, information for indicating a plurality of secondary cells to be scheduled through a joint coded control channel by using a higher layer signal, receives a separate coded control channel for scheduling a primary cell, and receives one joint coded control channel for scheduling the plurality of secondary cells. As described above, the separate coded control channel may be 1:1 mapped to the data channel of the primary cell, and the joint coded control channel may be 1:M mapped to the data channel of the plurality of secondary cells (where M is a natural number greater than or equal to 2). The memory 220 coupled to the processor 210 stores a variety of information for driving the processor 210. The RF unit 230 coupled to the processor 210 transmits and/or receives a radio signal.

The processors 110 and 210 may include an application-specific integrated circuit (ASIC), a separate chipset, a logic circuit, and/or a data processing unit and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include a base-band circuit for processing a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A method for scheduling in a carrier aggregation system, the method comprising:
   transmitting information for indicating a plurality of secondary cells to be scheduled through a joint coded control channel by using a higher layer signal;
   transmitting a separate coded control channel for scheduling a primary cell; and
   transmitting one joint coded control channel for scheduling the plurality of secondary cells,
   wherein the separate coded control channel is a control channel for scheduling one data channel transmitted through the primary cell, and the joint coded control channel is a control channel for scheduling a plurality of data channels transmitted through the plurality of secondary cells, and
   wherein if a semi-persistent scheduling (SPS) serving cell for performing semi-persistent scheduling exists among the plurality of secondary cells, a release of semi-persistent scheduling of the SPS serving cell is indicated by combining control information for scheduling the SPS serving cell in a joint coded physical downlink control channel (PDCCH).

2. The method of claim 1, wherein the higher layer signal is a radio resource control (RRC) message.

3. The method of claim 1, wherein the separate coded control channel and the joint coded control channel are transmitted through a primary downlink component carrier constituting the primary cell.

4. The method of claim 1, wherein the joint coded control channel includes a plurality of control information fields, and at least one of the plurality of control information fields includes a control value commonly applied to the plurality of secondary cells.

5. The method of claim 1, wherein the joint coded control channel uses only a downlink control information format for scheduling a specific number of secondary cells.

6. The method of claim 1, wherein the primary cell and the plurality of secondary cells use a time division duplex (TDD) frame, and are applied with different TDD configurations.

7. The method of claim 6, wherein if the plurality of secondary cells are applied with the different TDD configurations, the plurality of secondary cells are scheduled by the joint coded PDCCH only when all of identical subframes of the plurality of secondary cells are downlink subframes or uplink subframes.

8. The method of claim 1, wherein the higher layer signal further includes information indicating a serving cell for transmitting the joint coded control channel.

9. The method of claim 1, wherein the joint coded control channel uses only some control channel element (CCE) aggregation levels among CCE aggregation levels used in the separate coded control channel.

10. The method of claim 1, wherein the joint coded control channel is transmitted in a common search space for transmitting control information common to all user equipments in the primary cell.

11. The method of claim 1, wherein a plurality of data channels to be scheduled by the joint coded control channel include data channels transmitted through identical subframes of the plurality of secondary cells.

12. The method of claim 1, wherein a plurality of data channels to be scheduled by the joint coded control channel include data channels transmitted through different subframes of at least one secondary cell among the plurality of secondary cells.

13. A method for operating a user equipment in a carrier aggregation system, the method comprising:
   receiving information for indicating a plurality of secondary cells to be scheduled through a joint coded control channel by using a higher layer signal;
   receiving a separate coded control channel for scheduling a primary cell;
   receiving one joint coded control channel for scheduling the plurality of secondary cells; and
   receiving a data channel of the primary cell by using the separate coded control channel, and receiving a data channel of the plurality of secondary cells by using the joint coded control channel,
   wherein the separate coded control channel is a control channel for scheduling one data channel transmitted through the primary cell, and the joint coded control channel is a control channel for scheduling a plurality of data channels transmitted through the plurality of secondary cells, and
   wherein if a semi-persistent scheduling (SPS) serving cell for performing semi-persistent scheduling exists among the plurality of secondary cells, a release of semi-persistent scheduling of the SPS serving cell is indicated by combining control information for scheduling the SPS serving cell in a joint coded physical downlink control channel (PDCCH).

14. An apparatus comprising:
- a radio frequency (RF) unit for transmitting and receiving a radio signal; and
- a processor coupled to the RF unit,
- wherein the processor transmits information for indicating a plurality of secondary cells to be scheduled through a joint coded control channel by using a higher layer signal, transmits a separate coded control channel for scheduling a primary cell, and transmits one joint coded control channel for scheduling the plurality of secondary cells, and
- wherein the separate coded control channel is a control channel for scheduling one data channel transmitted through the primary cell, and the joint coded control channel is a control channel for scheduling a plurality of data channels transmitted through the plurality of secondary cells, and
- wherein if a semi-persistent scheduling (SPS) serving cell for performing semi-persistent scheduling exists among the plurality of secondary cells, a release of semi-persistent scheduling of the SPS serving cell is indicated by combining control information for scheduling the SPS serving cell in a joint coded physical downlink control channel (PDCCH).

* * * * *